(12) United States Patent
Wang

(10) Patent No.: US 7,832,302 B2
(45) Date of Patent: Nov. 16, 2010

(54) SHIFT-BY-WIRE SHIFTER WITH DEFAULT TO PARK

(75) Inventor: Yong Qiang Wang, Troy, MI (US)

(73) Assignee: Dura Global Technologies, LLC, Rochester Hills, MI (US)

(*) Notice: Subject to any disclaimer, the term of this patent is extended or adjusted under 35 U.S.C. 154(b) by 345 days.

(21) Appl. No.: 12/039,974

(22) Filed: Feb. 29, 2008

(65) Prior Publication Data
US 2009/0217782 A1    Sep. 3, 2009

(51) Int. Cl.
*G05G 5/00*    (2006.01)
(52) U.S. Cl. .................... 74/473.23; 74/473.28
(58) Field of Classification Search ........... 74/473.1, 74/473.12, 473.21, 473.23–473.28
See application file for complete search history.

(56) References Cited
U.S. PATENT DOCUMENTS
5,775,166 A * 7/1998 Osborn et al. ............ 74/473.25
2003/0056614 A1 * 3/2003 Babin et al. .............. 74/473.28
2004/0244524 A1 * 12/2004 Russell .................... 74/473.23
2005/0223835 A1 * 10/2005 Wang ...................... 74/473.18

* cited by examiner

*Primary Examiner*—Richard W Ridley
*Assistant Examiner*—Terence Boes
(74) *Attorney, Agent, or Firm*—Porter, Wright, Morris & Arthur LLP; Richard M. Mescher; Dean B. Watson

(57) ABSTRACT

A shift-by-wire shifter system includes a spring biased DTP lever engageable with a shifter lever assembly to move the shifter lever assembly to a park position. A DTP lock assembly secures the DTP lever so that the shifter lever assembly is selectively movable along the shift path during normal operation and releases the DTP lever so that the DTP lever moves the shifter lever assembly to the park position upon the loss of system power. A DTP actuator unlocks the shifter lever assembly and the DPT lock assembly upon the loss of system power so that the DTP lever automatically moves the shifter lever assembly to the park position upon the loss of system power. A power storage device is provided to release power to the DPT actuator upon the loss of system power.

20 Claims, 5 Drawing Sheets

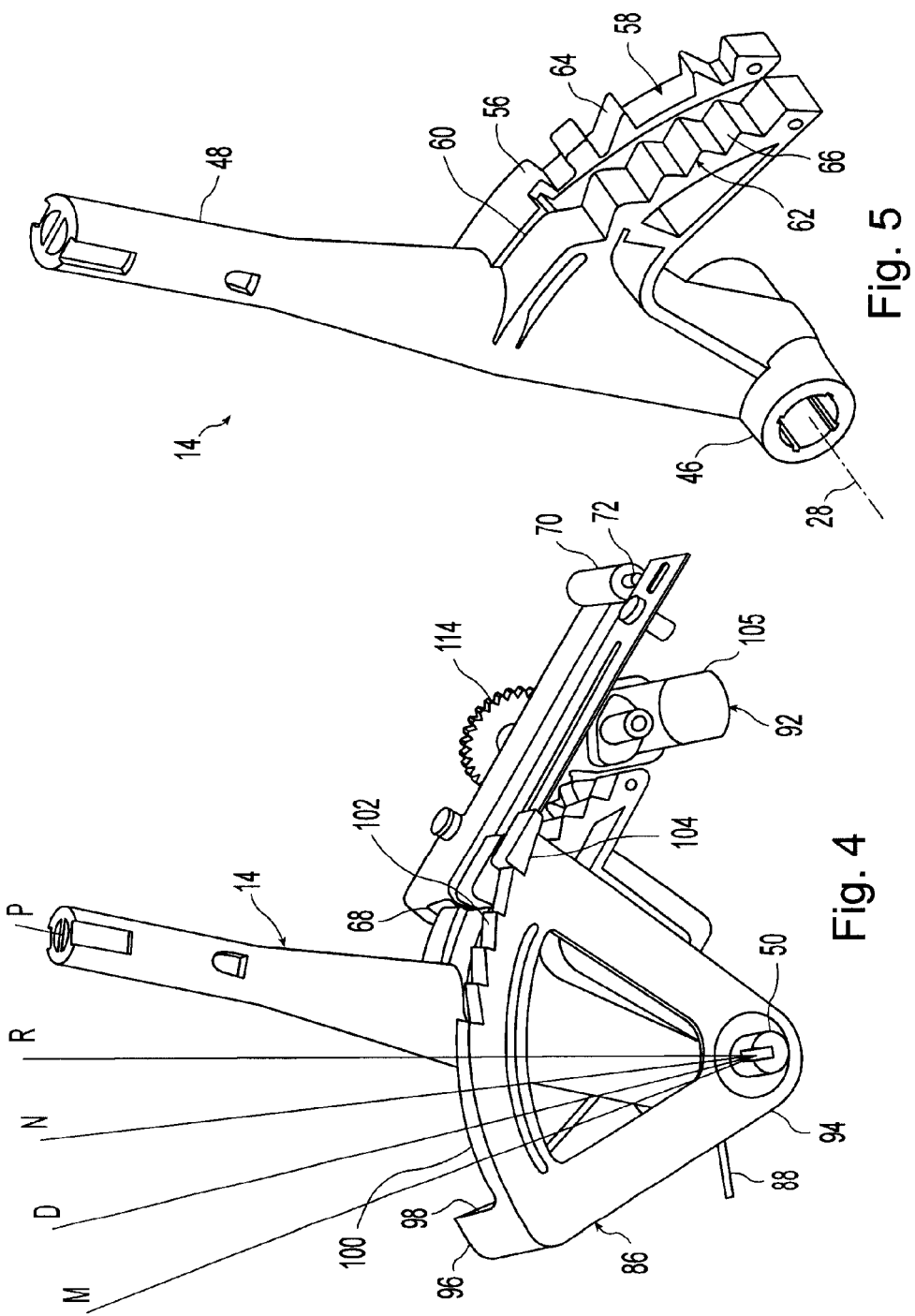

SHIFT-BY-WIRE SHIFTER WITH DEFAULT TO PARK

CROSS-REFERENCE TO RELATED APPLICATIONS

Not Applicable

STATEMENT REGARDING FEDERALLY SPONSORED RESEARCH

Not Applicable

REFERENCE TO MICROFICHE APPENDIX

Not Applicable

FIELD OF THE INVENTION

The field of the present invention generally relates to shifter systems for controlling automatic transmissions and, more particularly, to shift-by wire shifter systems for controlling automatic transmissions.

BACKGROUND OF THE INVENTION

In a motor vehicle equipped with an automatic transmission, typically a shifter lever is pivotable over a series of positions representative of desired transmission gears such as, for example, park (P), reverse (R), neutral (N), drive (D), and low gear (M). The shifter lever is connected to the motor vehicle automatic transmission by a suitable mechanical and/or electronic operating linkage to effect actuation of the transmission to the selected gear when the shifter lever is moved to the transmission gear's representative position. A user-actuated detent assembly typically releasably secures the shifter lever in a desired position to prevent inadvertent movement to other positions but permit desired movement to other positions. The detent assembly can include a mechanical actuator which is manually operated by the user to release the detent assembly or an electronic actuator which is electrically operated to release the detent assembly. A shifter having an electrically actuated detent assembly to selectively permit movement of the shift lever between the gear positions is typically referred to as a shift-by-wire shifter.

While shift-by-wire shifter systems have many benefits, under some circumstances the operator may not be able to move the shifter lever in the event of a power outage or a system failure. It is desirable for the shift lever to be in the park position in the event of a power outage or a system failure but this may not be possible if the power outage or system failure occurs when the shift lever is in a gear position other than the park position. Accordingly, there is a need in the art for a shift-by-wire shifter system which defaults to the park position when a power outage or system failure occurs.

SUMMARY OF THE INVENTION

Disclosed herein is a shift-by-wire shifter system which defaults to the park position when a power outage or system failure occurs. According to one embodiment there is disclosed herein a shift-by-wire shifter system comprising, in combination, a shifter lever assembly movable along a shift path, a gate profile defining a plurality of gear positions along the shift path, a gate pawl movable between a locking position wherein the gate pawl engages the gate profile to lock the shifter lever assembly in one of the plurality of gear positions and an unlocking position wherein the shifter lever assembly is movable along the shift path between the plurality of gear positions, and a shifter actuator operatively coupled to the gate pawl to selectively move the gate pawl from the locking position to the unlocking position in response to an operator input so that the operator can selectively move the shifter lever assembly between the plurality of gear positions. The plurality of gear positions includes a park position. A default-to-park (hereinafter DTP) lever is movable toward the park position and engageable with the shifter lever assembly to move the shifter lever assembly to the park position. A spring member biases the DTP lever toward the park position. A DTP lock assembly is operatively coupled the DTP lever to secure the DTP lever so that the shifter lever assembly is selectively movable along the shift path and to release the DTP lever so that the DTP lever moves the shifter lever assembly to the park position. A DTP actuator is operatively coupled to the gate pawl and the DTP lock assembly to selectively move the gate pawl to the unlocking position and release the DPT lock assembly so that the DTP lever moves the shifter lever assembly to the park position.

According to another embodiment there is disclosed herein a shift-by-wire shifter system comprising, in combination, a shifter lever assembly movable along a shift path, a gate profile defining a plurality of gear positions along the shift path, a gate pawl movable between a locking position wherein the gate pawl engages the gate profile to lock the shifter lever assembly in one of the plurality of gear positions and an unlocking position wherein the shifter lever assembly is movable along the shift path between the plurality of gear positions, and a shifter actuator operatively coupled to the gate pawl to selectively move the gate pawl from the locking position to the unlocking position in response to an operator input so that the operator can selectively move the shifter lever assembly between the plurality of gear positions. The plurality of gear positions includes a park position. A DTP lever is movable toward the park position and engageable with the shifter lever assembly to move the shifter lever assembly to the park position. A spring member biases the DTP lever toward the park position. A DTP lock assembly is operatively coupled the DTP lever to secure the DTP lever so that the shifter lever assembly is selectively movable along the shift path and to release the DTP lever so that the DTP lever moves the shifter lever assembly to the park position. An electric motor is operatively coupled to the gate pawl and the DTP lock assembly to selectively move the gate pawl to the unlocking position and release the DPT lock assembly so that the DTP lever moves the shifter lever assembly to the park position. The electric motor rotates a first cam to move the gate pawl to the unlocking position and rotates a second cam to release the DPT lock assembly. A power storage device operatively coupled to the electric motor. A controller operatively coupled to the energy storage device to release power from the energy storage device to the electric motor upon loss of system power to automatically move the shift lever assembly to the park position.

According to yet another embodiment there is disclosed herein a shift-by-wire shifter system comprising, in combination, a shifter lever assembly movable along a shift path, a gate profile defining a plurality of gear positions along the shift path, a gate pawl movable between a locking position wherein the gate pawl engages the gate profile to lock the shifter lever assembly in one of the plurality of gear positions and an unlocking position wherein the shifter lever assembly is movable along the shift path between the plurality of gear positions, and a shifter actuator operatively coupled to the gate pawl to selectively move the gate pawl from the locking position to the unlocking position in response to an operator input so that the operator can selectively move the shifter lever assembly between the plurality of gear positions. The plurality of gear positions includes a park position. A secondary detent profile is provided which corresponds with the plurality of gear positions. A secondary detent pawl is resiliently biased into engagement with the secondary detent profile as the shifter lever assembly moves over the shift path to provide frictional resistance to the movement of the shifter lever assembly. A DTP lever is movable toward the park position and engageable with the shifter lever assembly to move the shifter lever assembly to the park position. A spring member biases the DTP lever toward the park position. A DTP lock assembly is operatively coupled the DTP lever to secure the DTP lever so that the shifter lever assembly is selectively movable along the shift path and to release the DTP lever so that the DTP lever moves the shifter lever assembly to the park position. The DTP lock assembly includes an abutment carried by the DPT lever and a DTP pawl movable between a holding position wherein the DTP pawl engages the abutment to prevent the DPT lever from moving toward the park position and an unholding position wherein the DTP lever is released so that the DTP lever moves toward the park position. An electric motor is operatively coupled to the gate pawl, the secondary detent pawl, and the DTP pawl to selectively move the gate pawl to the unlocking position, move the secondary detent pawl out of engagement with the secondary detent profile, and move the DTP pawl to the unholding position so that the DTP lever moves the shifter lever assembly to the park position. The electric motor rotates a first cam to move the gate pawl to the unlocking position, rotates a second cam to move the DTP pawl the unholding position, and rotates a third cam to move the secondary detent pawl out of engagement with the secondary detent profile. A power storage device is operatively coupled to the electric motor. A controller is operatively coupled to the energy storage device to release power from the energy storage device to the electric motor upon loss of system power to automatically move the shift lever assembly to the park position.

From the foregoing disclosure and the following more detailed description of various preferred embodiments it will be apparent to those skilled in the art that the present invention provides a significant advance in the technology and art of motor vehicle shifter systems. Particularly significant in this regard is the potential the invention affords for providing a high quality, reliable assembly having default-to-park capability. Additional features and advantages of various preferred embodiments will be better understood in view of the detailed description provided below.

BRIEF DESCRIPTION OF THE DRAWINGS

These and further features of the present invention will be apparent with reference to the following description and drawings, wherein:

FIG. 4 is a perspective view of the shifter system of FIGS. 1 to 3 similar to FIG. 3 but with components removed for clarity and wherein the shifter lever assembly is in a park position (P);

FIG. 5 is a perspective view of the shifter lever assembly of FIGS. 1 to 4;

Figure 1:
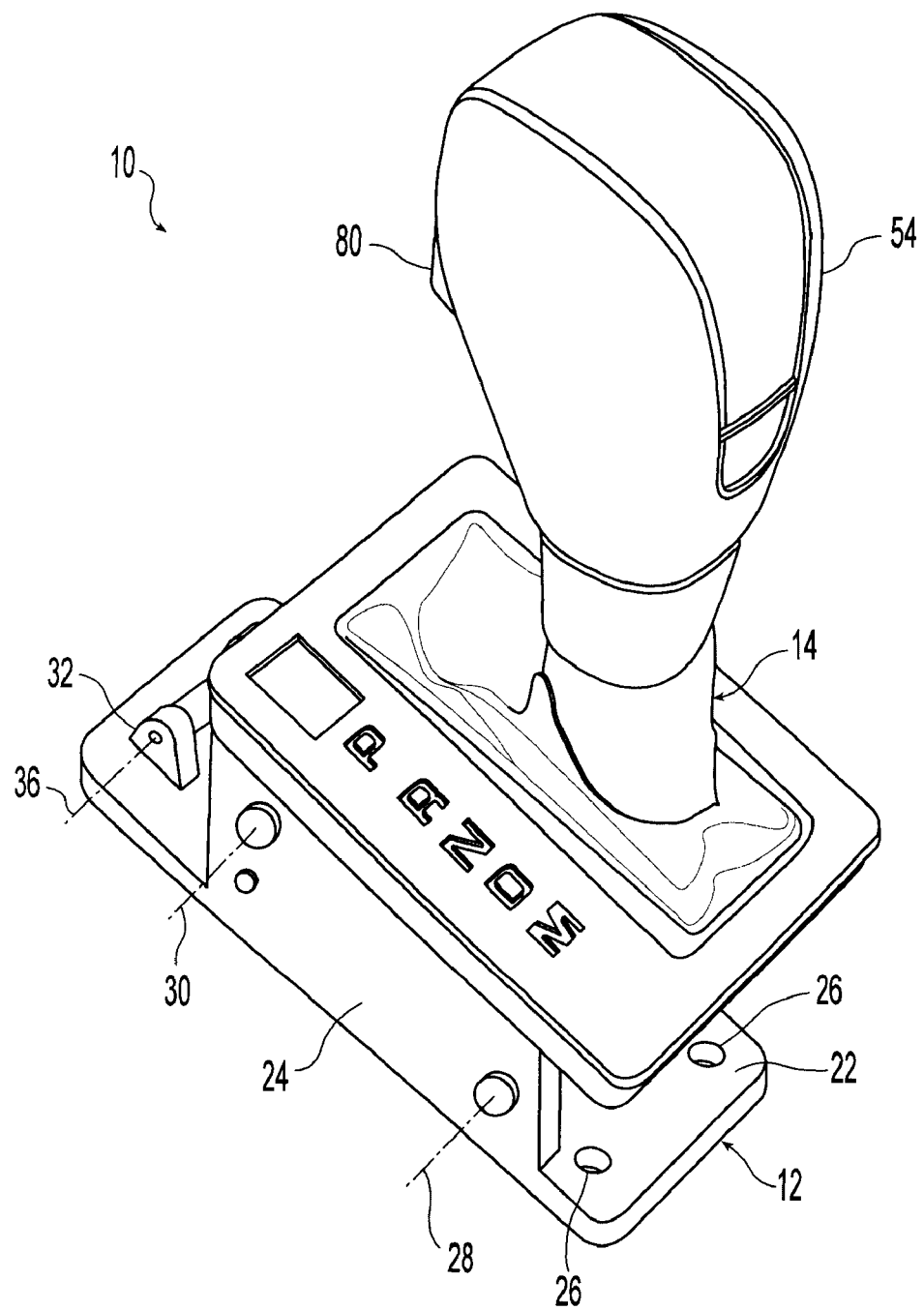
FIG. 1 is a perspective view of a shifter system according to a preferred embodiment of the present invention.
Figure 2:
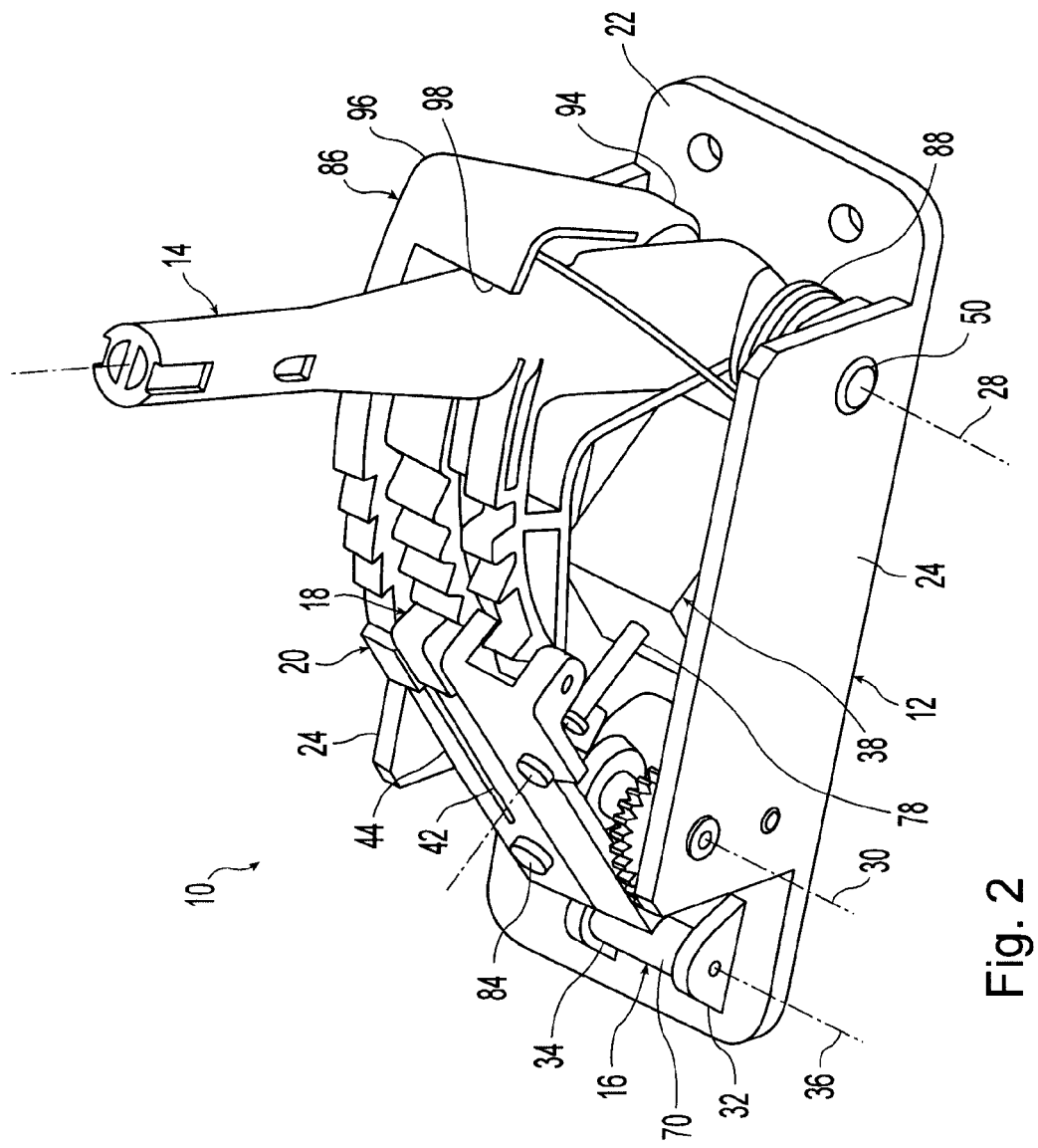
FIG. 2 is a perspective view of the shifter system of FIG. 1 generally showing the left and rear sides of the shifter system with components removed for clarity.
Figure 3:
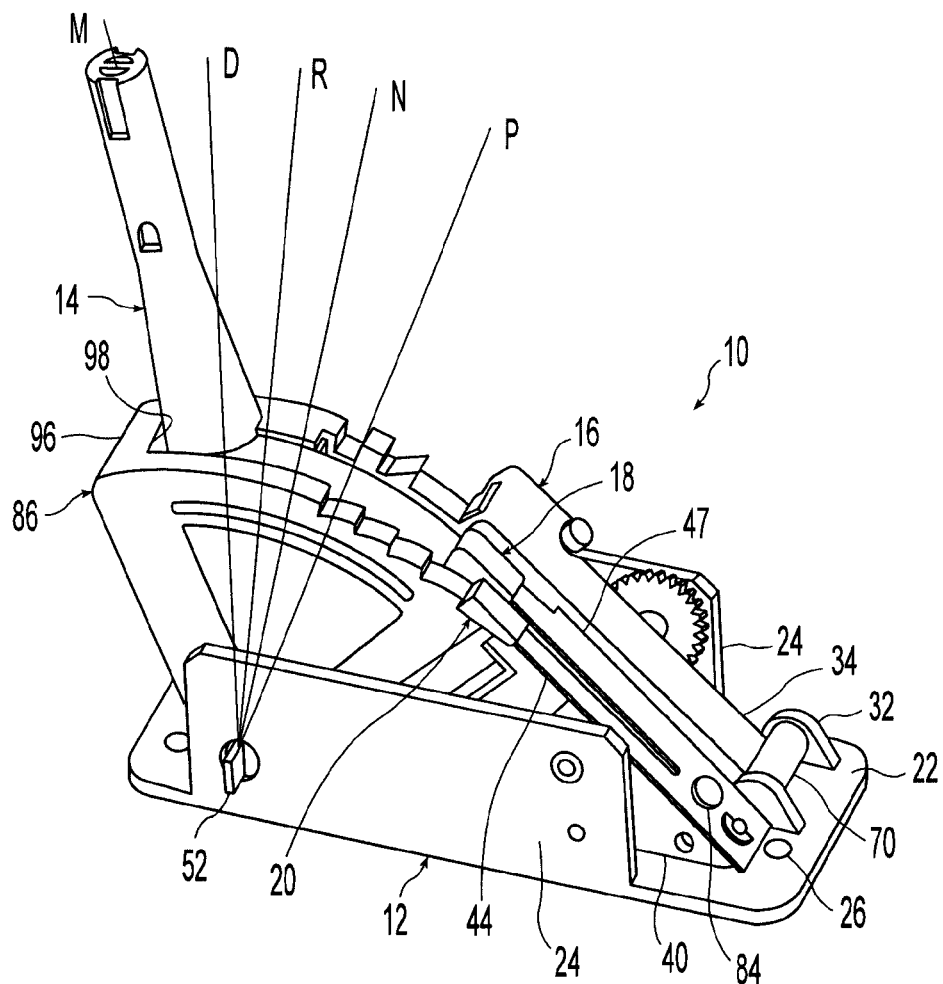
FIG. 3 is a perspective view of the shifter system of FIGS. 1 and 2 generally showing the right and front sides of the shifter systems with components removed for clarity and wherein a shifter lever assembly is in a low gear position (M)

It should be understood that the appended drawings are not necessarily to scale, presenting a somewhat simplified representation of various preferred features illustrative of the basic principles of the invention. The specific design features of the shifter systems as disclosed herein, including, for example, specific dimensions, orientations, locations, and shapes of the various components, will be determined in part by the particular intended application and use environment. Certain features of the illustrated embodiments have been enlarged or distorted relative to others to facilitate visualization and clear understanding. In particular, thin features may be thickened, for example, for clarity or illustration. All references to direction and position, unless otherwise indicated, refer to the orientation of the shifter mechanism illustrated in the drawings. In general, up or upward generally refers to an upward direction in FIG. 1 and down or downward generally refers to a downward direction in FIG. 1. Also in general, fore or forward refers to a direction toward the front of the vehicle, that is, generally toward the left in FIG. 1 and aft or rearward refers to a direction toward the rear of the vehicle, that is, generally toward the right in FIG. 1.

DETAILED DESCRIPTION OF CERTAIN PREFERRED EMBODIMENTS

It will be apparent to those skilled in the art, that is, to those who have knowledge or experience in this area of technology, that many uses and design variations are possible for the improved shifter systems disclosed herein. The following detailed discussion of various alternative and preferred embodiments will illustrate the general principles of the invention with reference to shifter systems for a motor vehicle such as an automobile, sport utility vehicle (SUV), cross-over vehicle, truck, or the like. Other embodiments suitable for other applications will be apparent to those skilled in the art given the benefit of this disclosure.

Referring now to the drawings, FIGS. 1 to 4 show a shifter system 10 according to a preferred embodiment of the present invention. The illustrated shifter mechanism 10 includes a frame or base 12, a shifter lever assembly 14 pivotably mounted to the base 12, a lock or detent assembly 16 releasably holding the shifter lever assembly 14 in a desired one of a plurality of gear positions against undesired or inadvertent movement to the other gear positions, a secondary detent assembly 18 providing the feel of a traditional mechanical system when selectively moving the shifter lever between the plurality of gear positions, and a default-to-park (DTP) assembly 20 which automatically defaults the shifter system 10 to a park position when a power outage or system failure occurs.

The base 12 is adapted to be attached to the motor vehicle in a fixed position such as a floor or console and can be formed of any suitable size and shape. The illustrated base 12 has generally planar base wall 22 shaped to engage the motor vehicle in a desired manner and a pair upwardly extending support walls 24 are provided at lateral sides of the base wall 22. The forward end of the illustrated base wall 22 is provided with an opening or hole 26 for receiving a mechanical fastener such as a bolt to secure the base 12 to the motor vehicle. The rearward end of the base wall 22 is provided with a pair of openings or holes 26 for receiving mechanical fasteners such as bolts to secure the base 12 to the motor vehicle. The support walls 24 are laterally spaced apart and provided with openings for pivotably mounting the shifter lever assembly 14 therebetween and define a horizontal and laterally extending pivot axis 28 for the shifter lever assembly 14 as described in more detail hereinafter. The support walls 24 are also provided with openings for pivotably mounting the DTP assembly 20 therebetween and define a horizontal and laterally extending rotational axis 30 for the DTP assembly 20 as described in more detail hereinafter. The rotational axis 30 is generally parallel to and spaced apart from the pivot axis 28 for the shifter lever assembly.

A pair of upwardly extending pivot flanges 32 are provided near the forward end of the base wall 22 toward the left side of the base 12. The pivot flanges 32 are laterally spaced apart and provided with coaxial openings for pivotably mounting a gate or detent lever 34 of the detent assembly 16 therebetween as described in more detail hereinafter. The flange openings define a horizontal and laterally extending pivot axis 36 for the detent lever 34 which is generally parallel to and spaced apart from the pivot axis 28 for the shifter lever assembly. A mounting block or bracket is provided along the left side of the base. The mounting bracket supports a shifter actuator 38 of the detent assembly 16 as described in more detail hereinafter. The mounting bracket can be generally wedge or triangular-shaped to provide an inclined surface facing in a generally upward and rearward direction for supporting the actuator 38. Another mounting block or bracket 40 is provided near the front end of the base 12 along the right side of the base 12 adjacent the pivot flanges 32. The mounting bracket 40 support secondary and DTP detent levers 42, 44 of the secondary detent assembly 18 and the DTP assembly 20 as described in more detail hereinafter. The illustrated mounting bracket 40 is generally wedge or triangular-shaped to provide an inclined surface facing in a generally upward and forward direction for supporting the secondary and DTP detent levers 42, 44. It is noted that other suitable configurations for the base 12 will be apparent to those skilled in the art.

The base 12 can be formed of any suitable material such as, for example, plastic and can be produced by any desirable method such as molding. Preferably, the base 12 is formed of unitary or one-piece construction but alternatively can be constructed of multiple components secured together.

As best shown in FIG. 5, the illustrated shifter lever assembly 14 includes a shifter yoke 46 and a shifter post or lever 48 upwardly extending from the shifter yoke 46 for manually moving the shifter yoke 46 to change the gear of the transmission. The lower end of the shifter yoke 46 is sized and shaped to extend between the support walls 24 of the base 12. A horizontal, laterally extending pivot pin 50 (FIGS. 2 and 4) extends through the yoke 46 and cooperates with the support wall openings to provide a pivotable connection between the shifter yoke 46 and the base 12. A rotational sensor 52 (FIG. 3) is provided to provide signals representing the gear position of the shifter lever assembly 14 that are utilized to change the gear of the vehicle automatic transmission.

Pivotably connected in this manner, the shifter lever assembly 14 is pivotable relative to the base 12 about the laterally extending pivot axis 28. The shifter yoke 46 can be selectively pivoted about the pivot axis 28 by manually applying a forward or rearward force to the shifter lever 48. The upper end of the shifter lever 46 is preferably provided with a handle or knob 54 (FIG. 1). The knob 54 is preferably provided with a shape to provide a suitable gripping surface for the hand of the operator.

The illustrated shifter yoke 46 includes a gate plate or flange 56 forming a gate or detent profile 58 and a secondary detent plate or flange 60 forming a secondary detent profile 62. The illustrated flanges 56, 60 are each have an arcuate upper edge formed about the pivot axis 28 and are parallel and laterally spaced apart. Constructed in this manner, the arcuate upper edge has a center of curvature at or near the pivot axis 28.

The arcuate upper edge of the gate flange 56 forms the gate profile 58. The illustrated gate profile 58 is an outward facing contoured surface formed by a plurality of grooves or notches 64 formed therein. The grooves 64 correspond with various gear positions in which the shifter lever assembly 14 can be shifted to provide a desired gear at the transmission of the motor vehicle. The grooves 64 define positions such as park (P), reverse (R), neutral (N), drive (D), and low gear (M). The shifter lever assembly 14 is electrically connected to the transmission of the motor vehicle via the sensor 52 so that movement the shifter lever assembly 14 to the various gear positions causes the transmission to move to the corresponding gear. The grooves 64 pivot about the pivot axis 28 with the gate flange 56 when the shifter yoke 46 is pivoted about the pivot axis 28 relative to the base 12 and are sized and shaped to cooperate with the detent lever 34 to limit movement of the shifter yoke 46 as discussed in more detail hereinbelow. The grooves 64 preferably cooperate with the detent lever 34 to lock the shifter lever assembly 14 in a desired gear position and prevent undesired or inadvertent movement from the desired gear position. It is noted that the grooves 64 can have any suitable sizes and shapes.

The arcuate upper edge of the secondary detent flange 60 forms the secondary detent profile 62. The illustrated secondary detent profile 62 is an outward facing contoured surface formed by a plurality of outward facing grooves or notches 66 formed therein. The grooves 66 correspond with the various gear positions defined by the gate profile 58. The grooves 66 pivot about the pivot axis 28 with the secondary detent flange 60 when the shifter yoke 46 is pivoted about the pivot axis 28 relative to the base 12 and are sized and shaped to cooperate with the detent lever 42 to provide a desired tactile feel or feedback to the user as discussed in more detail hereinbelow. The grooves 66 preferably cooperate with the detent lever 42 to provide resistance to movement between gear positions when pivoting the shifter lever assembly 14 in order to provide tactile feedback to the operator as to the locations of the various gear positions. It is noted that the grooves 66 can have any suitable sized and shapes.

The shifter lever assembly 14 can be formed of any suitable material such as, for example, plastic and can be produced by any desirable method such as molding. Preferably, the shifter yoke 46 and the shifter lever 48 are formed of unitary or one-piece construction but alternatively can be constructed of multiple components secured together.

The illustrated lock or detent assembly 16 includes a gate pawl 68 movable into and out of engagement with the gate profile 58 to lock and unlock the shifter yoke 46 against pivotable movement relative to the base 12 and the shifter actuator 38 for selectively moving the gate pawl 68 into and out of engagement with the gate profile 58. The pawl 68 is carried by the detent lever 34. The illustrated detent lever 34 is of rigid construction and is a generally elongate member having a first end adapted to pivotably connect to the flanges 32 of the base 12 and second end adapted to carry the gate pawl 68. The illustrated first or lower end of the detent lever 34 is in the form of a hub 70 having a laterally extending opening. A horizontal, laterally extending pivot pin 72 extends through the flange openings and the hub opening to provide a pivotable connection between the detent lever 34 and the base 12. Pivotably connected in this manner, the detent lever 34 is pivotable relative to the base 12 about the laterally extending pivot axis 36. The illustrated second or upper end is provided with a pair of downwardly extending and laterally spaced apart flanges 74. The flanges 74 are preferably spaced apart a distance adequate to receive the arcuate upper edge of the gate flange 56 therebetween. The flanges 74 are provided with coaxial openings to secure the gate pawl 68 thereto.

The illustrated gate pawl 68 is a rotatable wheel or roller but it is noted that the gate pawl can alternatively have any other suitable form such as, for example, a pin, protrusion, or the like. The gate pawl 68 is sized and shaped to closely to cooperate with the grooves 64 of the gate profile 58 so that the gate pawl 68 blocks and limits undesired pivotal movement of the shifter lever assembly 14 when the gate pawl 68 in the grooves 64 but permits pivotal movement of the shifter lever assembly 14 when the gate pawl 68 is removed from the grooves 64.

The illustrated shifter actuator 38 is a linear actuator in the form of an electric solenoid but any other suitable actuator can be utilized within the scope of the present invention. The illustrated electric solenoid 38 includes a body or housing 76 and an axially extendable pin or shaft 78. The pin 78 is typically in a retracted position (best shown in FIG. 2) but linearly moves along a central longitudinal axis to an extended position when the solenoid 38 is activated or energized. The illustrated solenoid body 76 is secured to the base 12 with the pin 78 extending forward and upward in a direction generally perpendicular to the gate profile 58 of the gate flange 56. The free end of the solenoid pin 78 is suitably connected to the detent lever 34 to pivot the detent lever 34 about the pivot axis 36 as the solenoid pin 78 moves along its axial path. It is noted that the connection permits the pin 78 to move along a linear path while the detent lever 34 moves along an arcuate path. The illustrated pin 78 is operatively connected to the detent lever 34 with a slot-link type connection. The illustrated pin 78 is provided with a head or engagement surface on each side of the detent lever 34 so that the pin 82 both pulls and pushes the detent lever 34. When the solenoid 38 is unactivated, the pin 78 is spring biased to its retracted position such that detent lever 34 is pulled downward with the gate pawl 68 in one of the grooves 64 of the gate profile 58 to lock the shifter yoke 46 in a desired gear position relative to the base 12. When the solenoid 38 is activated or energized and the pin 78 linearly moves from the retracted position to the extended position against the spring bias, the pin 78 pushes the detent lever 34 upward such that it pivots about the pivot axis 36. The pivoting motion of the detent lever 34 moves the gate pawl 68 from its locking position within the groove 64 to the unlocking position at least partially outside of the groove 64 so that the shifter yoke 46 can pivot to a desired position relative to the base 12. The gate pawl 68 thereby moves along an arcuate path to the unlocking position, that is, out of the groove 64, by activating or energizing the linear acting electric solenoid 38.

When the electric solenoid 38 is deactivated or deenergized, the pin 78 retracts from its extended position to its retracted position due to the spring bias. The pin 78 pulls the detent lever 34 pivot the detent lever 34 and move the gate pawl 68 back to its locking position within one of the grooves 64. Thus, the electric solenoid 38 biases the gate pawl 68 into its locking position when the solenoid is deactivated or deenergized.

The electric solenoid 38 can be part of any suitable control circuit. The control circuit preferably connects the coil of the electric solenoid 38 with a vehicle power system, such as a battery system and ignition/alternator system of the motor vehicle. The control circuit preferably includes an ignition interlock so that the electric solenoid 38 cannot be activated when the vehicle ignition is off and a brake interlock so that the electric solenoid 38 cannot be activated when the vehicle brake pedal is not depressed. Activation and deactivation of the solenoid 38 is at least partially controlled by operation of a user input device such as the illustrated shifter lever switch 80. When the operator desired to pivot the shifter lever assembly 14, they depress the switch 80 to unlock the detent assembly 16 so that the shifter lever assembly can be pivoted to a desired gear position. When the switch 80 is released, the detent assembly is locked to secure the shifter lever assembly in the current gear position. The illustrated switch 80 is located on the knob 54 but it is noted that the switch can be located at any other suitable location. The switch 80 is preferably a contact switch such as, for example, a push button switch or a dome switch but it is noted that any other suitable operator input device can alternatively be utilized. It is noted that U.S. patent application Ser. No. 10/812,664, the disclosure of which is expressly incorporated herein in its entirety by reference, discloses a suitable control circuit.

The illustrated secondary detent assembly 18 includes a secondary detent pawl 82 biased into engagement with the secondary detent profile 62 to follow the secondary detent profile and provide tactile feed back to the operator as the shifter yoke 46 is pivoted relative to the base 12. The illustrated secondary detent pawl 82 is carried by the secondary detent lever 42 which is in the form a leaf spring which biases the secondary detent pawl 82 into engagement with the secondary detent profile 62. The illustrated secondary detent lever 42 is an elongate planar leaf spring having a first end adapted to be connected to the base 12 and second end adapted to carry the secondary detent pawl 82. The illustrated first or lower end of the secondary detent lever 42 is provided with an opening sized and shaped for cooperating with a fastener 84 to secure the secondary detent lever 42 to the inclined surface the mounting bracket 40. Secured in this manner, the secondary detent lever 42 extends in a direction substantially parallel with a plane tangent to the operative groove 66 of the secondary detent profile 62. The illustrated second or upper end of the secondary detent lever 42 is provided with the secondary detent pawl 82 which is rigidly secured thereto. The secondary detent pawl 82 is sized and shaped to cooperate with the grooves 66 of the secondary detent flange 60 so that the secondary detent assembly 18 provides desired frictional resistance to the movement of the shifter lever assembly 14 even when the detent assembly 16 is in its unlocked position. As the shifter yoke 46 pivots relative to the base 12, the secondary detent lever 42 resiliently maintains the secondary detent pawl 82 in contact with the secondary detent profile 62 as the secondary detent pawl 82 moves along the secondary detent profile 62. The secondary detent lever 42 resiliently flexes so that the secondary detent pawl 82 follows the secondary detent profile 62. The secondary detent profile 62, the secondary detent pawl 82, and the secondary detent lever 42 are sized and shaped to provide a desired frictional resistance which can either be constant throughout the secondary detent profile 62 or vary along the secondary detent profile 62. It is noted that the secondary detent lever 42 can alternatively have other configurations such as, for example, the secondary detent lever 42 could be rigid and biased by a separate spring member.

The illustrated DTP assembly 20 includes a DTP lever 86 movable toward the park position and engageable with the shifter lever assembly 14 to move the shifter lever assembly 14 to the park position, a spring member 88 biasing the DTP lever 86 toward the park position, a DTP lock assembly 90 operatively coupled the DTP lever 86 to secure the DTP lever 86 so that the shifter lever assembly 14 is selectively movable along the shift path and to release the DTP lever 86 so that the DTP lever 86 moves the shifter lever assembly 14 to the park position, and a DTP actuator assembly 92 operatively coupled to the gate pawl 68 and the DTP lock assembly 90 to selectively move the gate pawl 68 to its unlocking position and to release the DTP lock assembly 90 so that the DTP lever 86 moves the shifter lever assembly 14 to the park position when there is a loss of power or system failure.

The illustrated DTP lever 86 includes a hub portion 94 for rotationally supporting the DTP lever 86 and an engagement portion 96 for engaging and moving the shifter lever assembly 14 to the park position when there is a loss of power or system failure. The hub portion 94 is sized and shaped to receive a portion of the shifter yoke 46 so that the DTP lever 86 pivots relative to the shifter lever assembly 14 about the same pivot axis 28. Pivotably connected in this manner, the DTP lever 86 is pivotable relative to both the base 12 and the shifter lever assembly 14 about the laterally extending pivot axis 28. The illustrated engagement portion 96 laterally extends rearward of the shifter lever 48 and forms a forward facing abutment or engagement surface 98 which is engageable with the shifter lever 48 upon forward pivoting motion of the DTP lever about the pivot axis 28. The illustrated DTP lever 86 also includes a DTP plate or flange 100 having an arcuate upper edge with a center of curvature at or near the pivot axis 28. The upper edge forms at least one forward facing detent or abutment of the DTP lock assembly 90 which, when the DTP lock assembly 90 is locked, holds the DTP lever 86 against forward pivoting motion relative to the base 12 or the shift lever assembly and positioned rearward of the shift path so that shift lever assembly 14 is free to move over the entire shift path. The illustrated DTP flange 100 is provided with a plurality of abutments 102 in the form of ratchet teeth which permit reward pivoting motion of the DTP lever 86 but prevent forward pivoting motion of the DTP lever 86 when the DTP lock assembly 90 is locked.

The DTP lever 86 can be formed of any suitable material such as, for example, plastic and can be produced by any desirable method such as molding. Preferably, the DTP lever 86 is formed of unitary or one-piece construction but alternatively can be constructed of multiple components secured together.

The illustrated spring member 88 is a torsion spring acting between the base 12 and the DTP lever 86 to resiliently bias the DTP lever 86 in a forward direction into engagement with the shifter lever assembly 14 and toward the park position of the shift path. The illustrated torsion spring 88 has a coil portion sized to receive a portion of the shifter yoke 46 opposite the DTP lever 86 and leg portions for engaging the base 12 and the DTP lever 86. It is noted that any other suitable type of spring members can alternatively be utilized.

The illustrated DTP lock assembly 90 includes a DTP pawl 104 biased into engagement with the DTP flange 100 to follow the DTP flange and cooperate with the abutments 102 to permit reward pivoting motion of the DTP lever 86 but prevent forward pivoting motion of the DTP lever 86. The illustrated DTP pawl 104 is carried by the DTP detent lever 44 which is in the form a leaf spring which biases the DTP pawl 104 into engagement with the DTP flange 100. The illustrated DPT detent lever 44 is an elongate planar leaf spring having a first end adapted to be connected to the base 12 and second end adapted to carry the DPT pawl 104. The illustrated DPT lever is constructed unitary with the secondary detent lever 42 so that they have a common first or lower end provided with the opening sized and shaped for cooperating the a fastener 84 to secure the levers 42, 44 to the inclined surface the mounting bracket 40. Secured in this manner, the DPT detent lever 44 extends in a direction substantially parallel with a plane tangent to the DPT flange 100 and is parallel and laterally spaced apart from the secondary detent lever 42 and the gate lever 34. The illustrated second or upper end of the DPT detent lever 44 is provided with the DPT pawl 104 which is rigidly secured thereto. The DPT pawl 104 is sized and shaped to cooperate with the ratchet teeth or abutments 102 of the DPT flange 100 so that the DTP lock assembly 90 permits reward pivoting motion of the DTP lever 86 but prevents forward pivoting motion of the DTP lever 86 when the DTP pawl is in a holding position engaging the DTP flange 100 and permits pivoting motion of the DPT lever 86 in either direction when the DPT pawl is in an unholding position out of engagement with the DPT flange 100. The DPT lever 44 resiliently flexes so that the DPT pawl 104 follows the DPT flange 100 as the DPT lever is ratcheted in a rearward direction when the DPT pawl 104 is in its holding position. It is noted that the DPT detent lever 44 can alternatively have other configurations such as, for example, The DPT detent lever 44 could be formed separate from the secondary detent lever 42 or the DPT detent lever 44 could be rigid and biased by a separate spring member.

Figure 6:
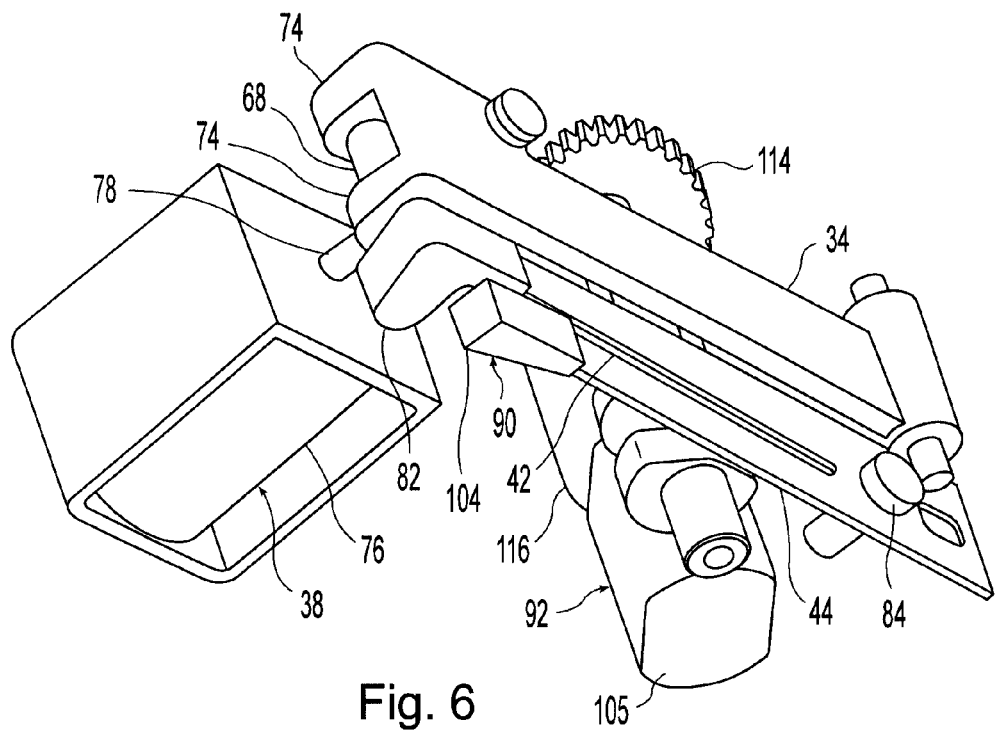
FIG. 6 is perspective view of detent, secondary detent, and default-to-park (DTP) assemblies of the shifter system of FIGS. 1 to 4.
Figure 7:
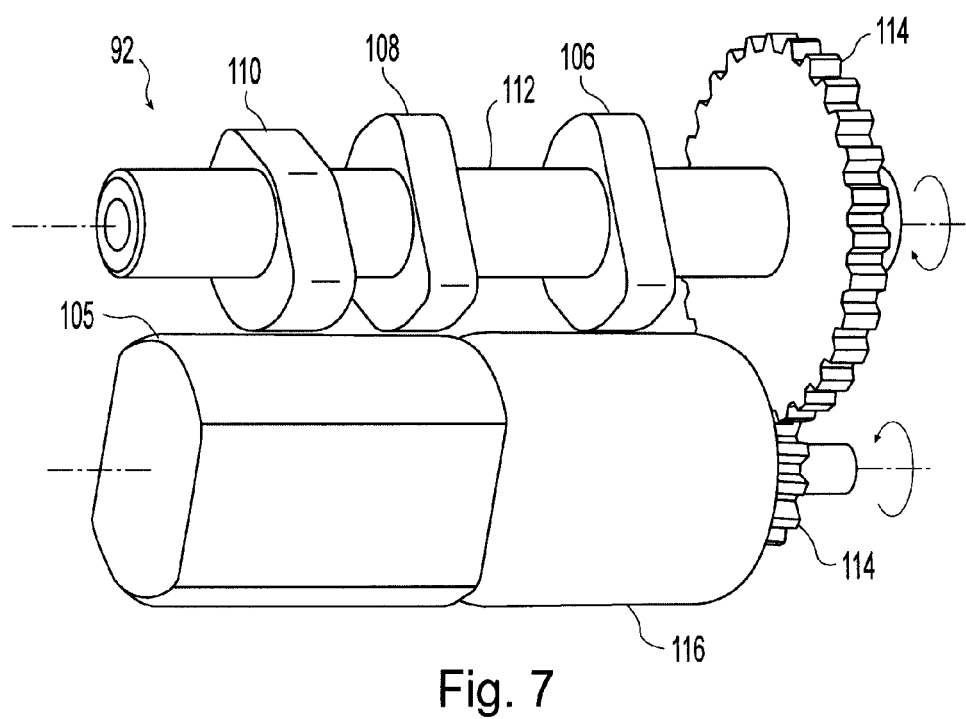
FIG. 7 is a perspective view of a DTP actuator assembly of the DLP assembly of FIG. 6.

As best shown in FIGS. 6 and 7, the illustrated DTP actuator 92 is an electric motor 105 operatively connected to the gate lever 34, the secondary detent lever 42, and the DTP detent lever 44 with cams 106, 108, 110. The cams 106, 108, 110 are each secured to a common cam shaft 112. The illustrated cam shaft 112 laterally extends between and is supported by the support walls of the base 12 below the gate lever 34, the secondary detent lever 42, and the DTP detent lever 44 respectively. The cams 106, 108, 110 are sized, shaped and positioned so that they engage the gate lever 34, the secondary detent lever 42, and the DTP detent lever 44 respectively so that rotation of the cam shaft 112 rotates the gate cam 106 to move the gate pawl 68 from its locking position to its unlocking position, rotates the secondary detent cam 108 to move the secondary detent pawl 82 from its engaging position to an unengaging position, and rotates the DTP cam 110 to move the DTP pawl 104 from its holding position to its unholding position. Preferably the cams 106, 108, 110 are configured to move the gate pawl 68 to its unlocking position and the secondary detent pawl 82 out of engagement with the secondary detent profile 62 prior to moving the DTP pawl 104 to its unholding position. An output shaft of the electric motor 105 is operatively connected to the cam shaft 112 so that rotation of the motor output shaft rotates the cam shaft 112. The illustrated electric motor 105 is located below and parallel to the cam shaft 112 is operatively connected to the cam shaft 112 with a plurality of gears 114. The illustrated electric motor 105 is also provided with a reduction gearbox 116 located between the motor output shaft and the gears 114 which reduces speed and increases torque. The electric motor 105 is preferably a DC electric motor and can be of any suitable type. It is noted that the DPT actuator 92 can alternatively be of any other suitable type or configuration.

Figure 8:
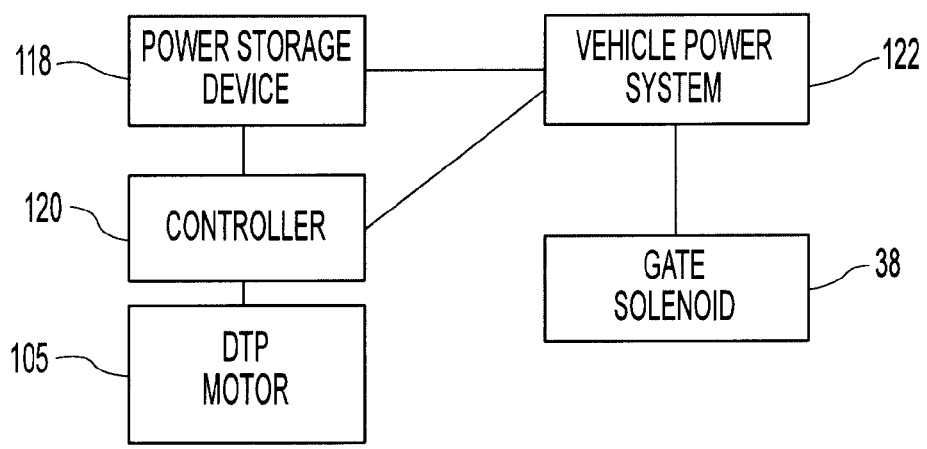
FIG. 8 is a block diagram of the detent and DLP assemblies of shifter system of FIGS. 1 to 4.

As best shown in FIG. 8, the control circuit for the DTP actuator includes an electric power storage device 118 operable to store electric power suitable for activating the DTP actuator 92 when there is an electric power loss or system failure and an on-board computer or controller 120 operatively connecting the power storage device 118 to the DTP actuator 92 to release electric power from the power storage device 118 to the DTP actuator 92 upon an electric power loss or system failure. The power storage device 118 is preferably a capacitor operatively connected to the vehicle power system 122 but can alternatively be any other suitable electric power storage device such as, for example, a diode, a battery, or the like.

Under normal operating conditions, the gate pawl 68 is in its locking position to secure the shifter lever assembly 14 in a gear position, the secondary detent pawl 82 is in its engaging position to provide frictional resistance to movement between the gear positions, and the DTP pawl 104 is in its holding position to secure the DPT lever 86 in its full rearward position so that the operator can selectively move the shifter lever assembly 14 can move in either direction between the park position (P) and the low gear position (M). To change gear positions, the operator manually activates the shifter lever switch 80 which energizes the shifter actuator 38 to move the gate pawl 68 from its locking position to its unlocking position. With the gate pawl 68 in its unlocking position, the operator can manually push or pull the shifter lever assembly 14 against the resistance of the secondary detent assembly 18 to move the shifter lever assembly 14 to a desired gear position. It is noted that the DTP lever 86 remains stationary as the shifter lever assembly 14 is pivoted. When in the desired gear position, the operator releases the shifter lever switch 80 which de-energizes the shifter actuator 38 to permit the gate pawl 68 to resiliently return to its locking position. With the gate pawl 68 in its locking position, the shifter lever assembly 14 is secured in the desired gear position.

When there is a loss of power or system failure, the controller 120 releases power from the power storage device 118 to the motor 105 which rotates the cam shaft 112. Rotation of the cam shaft 112 rotates the cams 106, 108, 110 to first move the gate pawl 68 to its unlocking position and to move the secondary detent pawl 82 out of engagement, and then to move the DTP pawl 104 to its unholding position. With the DTP pawl 104 in its unholding position, the DTP lock assembly 90 is unlocked so that the DPT spring member 88 resiliently moves the DPT lever 86 in a forward direction toward the park position and into engagement with the shifter lever assembly 14. If the shifter lever assembly 14 is in any gear position other than the park position (P), the DTP lever 86 pushes the shifter lever assembly 14 to the park position (P) by the force provided by the spring member 88. It is noted that alternatively the secondary detent assembly 18 could remain engaged but the pushing force of the DTP lever 86 would need to be high enough to overcome the resistance to movement provided by the secondary detent assembly 18. Once the system is repaired and/or system power is reestablished, the controller activates the DTP actuator 92 to rotate the cams 106, 108, 110 to move the gate pawl 68 to its locking position, to move the secondary detent pawl 82 into engagement, and to move the DTP pawl 104 to its holding position. The DTP lever 86 will rearwardly ratchet when the shifter lever assembly 14 is rearwardly moved and will move to its rearmost position the first time the shifter lever assembly 14 is rearwardly moved to the low gear position (M).

It is apparent from the above detailed description of preferred embodiments of the present invention, that the shift-by-wire shifter systems automatically default to the park position when a power outage or system failure occurs.

From the foregoing disclosure and detailed description of certain preferred embodiments, it is also apparent that various modifications, additions and other alternative embodiments are possible without departing from the true scope and spirit of the present invention. The embodiments discussed were chosen and described to provide the best illustration of the principles of the present invention and its practical application to thereby enable one of ordinary skill in the art to utilize the invention in various embodiments and with various modifications as are suited to the particular use contemplated. All such modifications and variations are within the scope of the present invention as determined by the appended claims when interpreted in accordance with the benefit to which they are fairly, legally, and equitably entitled.

What is claimed is:

1. A shift-by-wire shifter system comprising, in combination:
    a shifter lever assembly movable along a shift path;
    a gate profile defining a plurality of gear positions along the shift path;
    wherein the plurality of gear positions includes a park position;
    a gate pawl movable between a locking position wherein the gate pawl engages the gate profile to lock the shifter lever assembly in one of the plurality of gear positions and an unlocking position wherein the shifter lever assembly is movable along the shift path between the plurality of gear positions;
    a shifter actuator operatively coupled to the gate pawl to selectively move the gate pawl from the locking position to the unlocking position in response to an operator input so that the operator can selectively move the shifter lever assembly between the plurality of gear positions;
    a DTP lever movable toward the park position and engageable with the shifter lever assembly to move the shifter lever assembly to the park position;
    a spring member biasing the DTP lever toward the park position;
    a DTP lock assembly operatively coupled to the DTP lever to secure the DTP lever so that the shifter lever assembly is selectively movable along the shift path and to release the DTP lever so that the DTP lever moves the shifter lever assembly to the park position; and
    a DTP actuator operatively coupled to the gate pawl and the DTP lock assembly to selectively move the gate pawl to the unlocking position and release the DPT lock assembly so that the DTP lever moves the shifter lever assembly to the park position.

2. The shift-by-wire shifter system according to claim 1, further comprising a power storage device operatively coupled to the DPT actuator to provide power to the DPT actuator and a controller operatively coupled to the power storage device to release power from the power storage device to the DPT actuator upon loss of system power to automatically move the shift lever assembly to the park position.

3. The shift-by-wire shifter system according to claim 2, wherein the power storage device is a capacitor.

4. The shift-by-wire shifter system according to claim 1, wherein the DTP actuator is an electric motor.

5. The shift-by-wire shifter system according to claim 4, wherein the electric motor rotates a first cam to move the gate pawl to the unlocking position and rotates a second cam to release the DPT lock assembly.

6. The shift-by-wire shifter system according to claim 1, wherein the DTP actuator is operatively coupled to the gate pawl and the DTP lock assembly to selectively move the gate pawl to the unlocking position prior to releasing the DPT lock assembly.

7. The shift-by-wire shifter system according to claim 1, wherein the DTP lock assembly includes an abutment carried by the DPT lever and a DTP pawl movable between a holding position wherein the DTP pawl engages the abutment to prevent the DPT lever from moving toward the park position and an unholding position wherein the DTP lever is released so that the DTP lever moves toward the park position.

8. The shift-by-wire shifter system according to claim 7, wherein the DTP pawl is biased into engagement with the abutment by a leaf spring.

9. The shift-by-wire shifter system according to claim 7, the abutment is one of a plurality of abutments in the form of ratchet teeth which prevent movement of the DTP lever toward the park position but permit movement of the DTP lever away from the park position.

10. The shift-by-wire shifter system according to claim 9, wherein the ratchet teeth correspond with the plurality of gear positions.

11. A shift-by-wire shifter system comprising, in combination:
a shifter lever assembly movable along a shift path;
a gate profile defining a plurality of gear positions along the shift path;
wherein the plurality of gear positions includes a park position;
a gate pawl movable between a locking position wherein the gate pawl engages the gate profile to lock the shifter lever assembly in one of the plurality of gear positions and an unlocking position wherein the shifter lever assembly is movable along the shift path between the plurality of gear positions;
a shifter actuator operatively coupled to the gate pawl to selectively move the gate pawl from the locking position to the unlocking position in response to an operator input so that the operator can selectively move the shifter lever assembly between the plurality of gear positions;
a DTP lever movable toward the park position and engageable with the shifter lever assembly to move the shifter lever assembly to the park position;
a spring member biasing the DTP lever toward the park position;
a DTP lock assembly operatively coupled to the DTP lever to secure the DTP lever so that the shifter lever assembly is selectively movable along the shift path and to release the DTP lever so that the DTP lever moves the shifter lever assembly to the park position;
an electric motor operatively coupled to the gate pawl and the DTP lock assembly to selectively move the gate pawl to the unlocking position and release the DPT lock assembly so that the DTP lever moves the shifter lever assembly to the park position;
wherein the electric motor rotates a first cam to move the gate pawl to the unlocking position and rotates a second cam to release the DPT lock assembly;
a power storage device operatively coupled to the electric motor; and
a controller operatively coupled to the power storage device to release power from the power storage device to the electric motor upon loss of system power to automatically move the shift lever assembly to the park position.

12. The shift-by-wire shifter system according to claim 11, wherein the power storage device is a capacitor.

13. The shift-by-wire shifter system according to claim 11, wherein the first cam and the second cam are configured to move the gate pawl to the unlocking position prior to releasing the DPT lock assembly.

14. The shift-by-wire shifter system according to claim 11, wherein the DTP lock assembly includes an abutment carried by the DPT lever and a DTP pawl movable between a holding position wherein the DTP pawl engages the abutment to prevent the DPT lever from moving toward the park position and an unholding position wherein the DTP lever is released so that the DTP lever moves toward the park position.

15. The shift-by-wire shifter system according to claim 14, wherein the DTP pawl is biased into engagement with the abutment by a leaf spring.

16. The shift-by-wire shifter system according to claim 14, the abutment is one of a plurality of abutments in the form of ratchet teeth which prevent movement of the DTP lever toward the park position but permit movement of the DTP lever away from the park position.

17. The shift-by-wire shifter system according to claim 16, wherein the ratchet teeth correspond with the plurality of gear positions.

18. A shift-by-wire shifter system comprising, in combination:
a shifter lever assembly movable along a shift path;
a gate profile defining a plurality of gear positions along the shift path;
wherein the plurality of gear positions includes a park position;
a gate pawl movable between a locking position wherein the gate pawl engages the gate profile to lock the shifter lever assembly in one of the plurality of gear positions and an unlocking position wherein the shifter lever assembly is movable along the shift path between the plurality of gear positions;
a shifter actuator operatively coupled to the gate pawl to selectively move the gate pawl from the locking position to the unlocking position in response to an operator input so that the operator can selectively move the shifter lever assembly between the plurality of gear positions;
a secondary detent profile corresponding with the plurality of gear positions;
a secondary detent pawl resiliently biased into engagement with the secondary detent profile as the shifter lever assembly moves over the shift path to provide frictional resistance to the movement of the shifter lever assembly;
a DTP lever movable toward the park position and engageable with the shifter lever assembly to move the shifter lever assembly to the park position;
a spring member biasing the DTP lever toward the park position;
a DTP lock assembly operatively coupled to the DTP lever to secure the DTP lever so that the shifter lever assembly is selectively movable along the shift path and to release the DTP lever so that the DTP lever moves the shifter lever assembly to the park position;
wherein the DTP lock assembly includes an abutment carried by the DPT lever and a DTP pawl movable between a holding position wherein the DTP pawl engages the abutment to prevent the DPT lever from moving toward the park position and an unholding position wherein the DTP lever is released so that the DTP lever moves toward the park position;
an electric motor operatively coupled to the gate pawl, the secondary detent pawl, and the DTP pawl to selectively move the gate pawl to the unlocking position, move the secondary detent pawl out of engagement with the secondary detent profile, and move the DTP pawl to the unholding position so that the DTP lever moves the shifter lever assembly to the park position;

wherein the electric motor rotates a first cam to move the gate pawl to the unlocking position, rotates a second cam to move the DTP pawl the unholding position, and rotates a third cam to move the secondary detent pawl out of engagement with the secondary detent profile;

a power storage device operatively coupled to the electric motor; and a controller operatively coupled to the power storage device to release power from the power storage device to the electric motor upon loss of system power to automatically move the shift lever assembly to the park position.

19. The shift-by-wire shifter system according to claim 18, wherein the power storage device is a capacitor.

20. The shift-by-wire shifter system according to claim 18, wherein the first cam, the second cam, and the third cam are configured to move the gate pawl to the unlocking position and the secondary detent pawl out of engagement with the secondary detent profile prior to moving the DTP pawl to the unholding position.

* * * * *